(12) United States Patent
Gronberg et al.

(10) Patent No.: US 7,185,643 B2
(45) Date of Patent: Mar. 6, 2007

(54) COMBINED FILTER AND FILL TUBE

(75) Inventors: Philip F. Gronberg, Sugar Grove, IL (US); Timothy M. Lyons, Batavia, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/967,965

(22) Filed: Oct. 19, 2004

(65) Prior Publication Data

US 2006/0081229 A1 Apr. 20, 2006

(51) Int. Cl.
F16N 21/00 (2006.01)

(52) U.S. Cl. .................. 123/572; 123/573

(58) Field of Classification Search ........ 123/572–574, 123/41.86; 55/510; 220/371, 370
See application file for complete search history.

(56) References Cited

U.S. PATENT DOCUMENTS

| | | | |
|---|---|---|---|
| 3,313,281 A * | 4/1967 | Schneider ................ 123/572 |
| 3,451,584 A * | 6/1969 | Degaetano ............... 220/371 |
| 3,885,317 A | 5/1975 | Karls | |
| 4,021,924 A | 5/1977 | Haines | |
| 4,401,093 A * | 8/1983 | Gates et al. ............. 123/573 |
| 4,579,092 A * | 4/1986 | Kandler .................. 123/41.86 |
| 4,993,517 A * | 2/1991 | Leipelt et al. ........... 184/105.1 |
| 5,042,678 A * | 8/1991 | Munguia ................. 220/254.9 |
| 5,080,082 A * | 1/1992 | Mueller et al. .......... 123/574 |
| 5,140,968 A * | 8/1992 | Doan ...................... 123/572 |
| 6,073,618 A | 6/2000 | Sanders et al. | |
| 6,161,529 A * | 12/2000 | Burgess .................. 123/572 |
| 6,585,128 B2 | 7/2003 | Clevenger et al. | |
| 6,852,148 B2 * | 2/2005 | Gieseke et al. .......... 95/287 |

* cited by examiner

*Primary Examiner*—Marguerite McMahon
(74) *Attorney, Agent, or Firm*—Elias P. Soupos; Susan L. Lukasik; Jeffrey P. Calfa

(57) ABSTRACT

An apparatus includes a housing (101), a fill tube (107) disposed within the housing (101), the fill tube (107) having a fluid inlet (125) at one end and a fluid outlet (127) at another end. The fluid outlet (127) is disposed near a passage (103) of the housing (101) such that fluid entering the fluid inlet (125) exits the housing (101) through the passage (103). A filter (113) is disposed outside the fill tube (107) and inside the housing (101), such that unfiltered gases from the passage (103) are capable of entering the filter (113). A gas outlet (121) is integrated with the housing (101), such that filtered gases from the filter (113) are capable of exiting the housing (101) through the gas outlet (121).

12 Claims, 6 Drawing Sheets

COMBINED FILTER AND FILL TUBE

FIELD OF THE INVENTION

This invention relates to internal combustion engines, including but not limited to recirculation of crankcase gases into the intake system of an engine.

BACKGROUND OF THE INVENTION

Combustion gases are generated during the operation of an internal combustion engine. A small amount of these gases leaks past the piston seals of the internal combustion engine, and unless the gases are removed from the crankcase, they become trapped. These gases, commonly referred to in the art as blow-by gases, need to be released from the crankcase and are usually recirculated into the engine air intake system. Blow-by gases that are released from the crankcase sometimes carry combustion by-products. Splashing of the engine's rotating components as well as oil circulating within the crankcase and the oil pan generate oil mist in the blow-by gases. It is desirable to remove the oil mist from the gas prior to introduction into the intake air system. An apparatus that removes oil mist from blow-by gases is commonly referred to as a breather.

Existing breather systems are sized for specific engine applications, and can take up an excessive amount of engine compartment space. Engine compartment space is usually limited, and space savings are always desirable.

In the case where relatively high blow-by rates are expected, or high efficiency is demanded from the system, breathers with filters are used. The disadvantage of breather systems that use filters is the large size of the breather assembly. Accordingly, there is a need for an efficient and space saving breather system for an internal combustion engine.

SUMMARY

An apparatus includes a housing, a fill tube disposed within the housing, the fill tube having a fluid inlet at one end and a fluid outlet at another end. The fluid outlet is disposed near a passage of the housing such that fluid entering the fluid inlet exits the housing through the passage. A filter is disposed outside the fill tube and inside the housing, such that unfiltered gases from the passage are capable of entering the filter. A gas outlet is integrated with the housing, such that filtered gases from the filter are capable of exiting the housing through the gas outlet.

DETAILED DESCRIPTION

The following describes an apparatus for and method of filtering oil mist from a gas stream while providing a passage for adding oil through the same apparatus to an internal combustion engine. The apparatus is compact and efficient at separating oil mist from blow-by gases.

Figure 1:
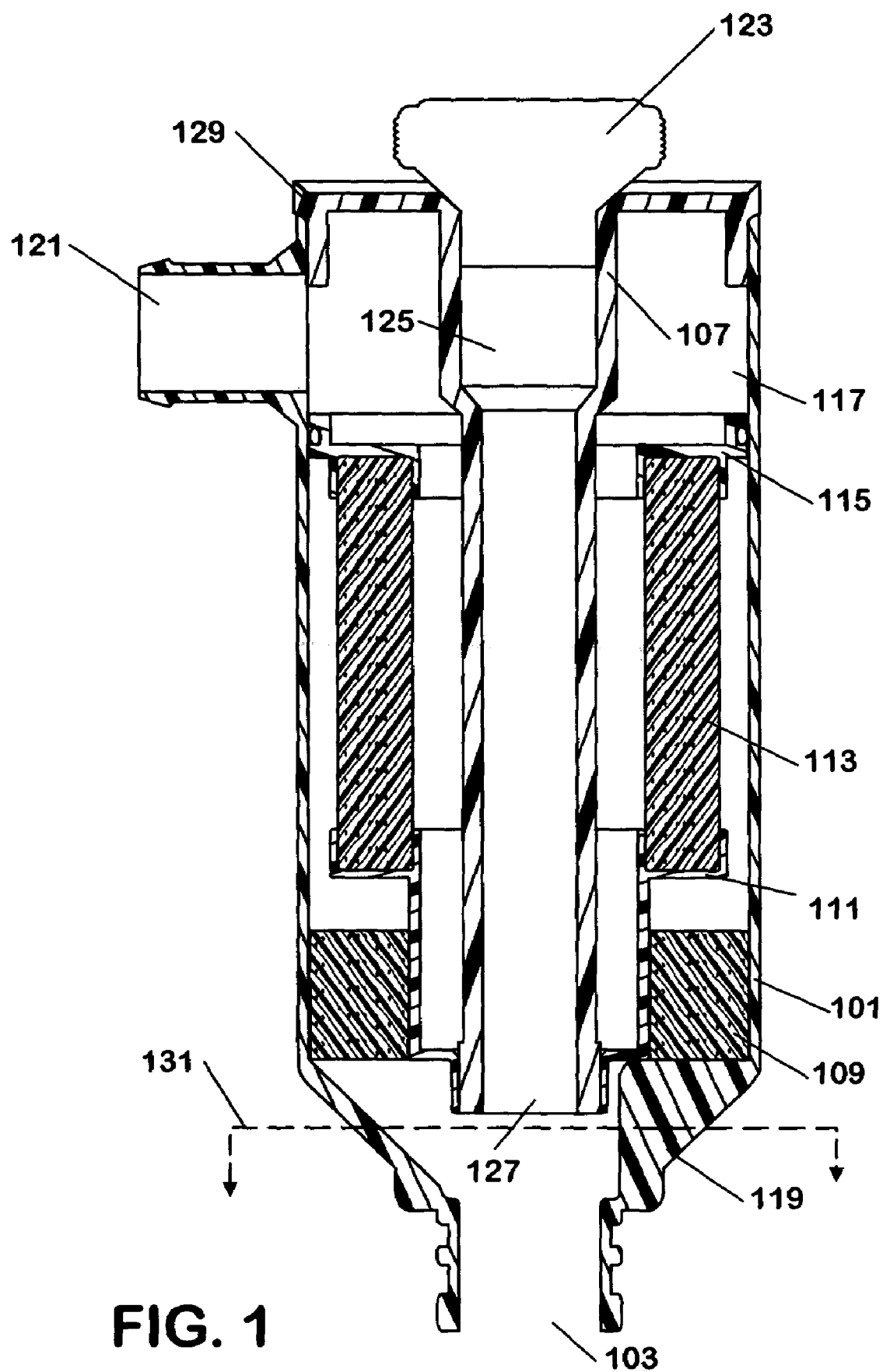
FIG. 1 is a cross-sectional view of an integrated oil separator and oil fill tube in accordance with the invention.

A cross-sectional view of an integrated oil separator and oil fill tube is shown in FIG. 1. A housing 101 has a passage 103 at one end. A plurality of ribs 119 (see FIG. 3) are disposed above the passage 103. The passage 103 is in fluid communication with, for example, an internal combustion engine. An oil fill tube 107 is disposed in the housing 101 and advantageously has a centerline substantially parallel to the centerline of the housing 101. A fluid inlet 125 at one end of the oil fill tube 107 is advantageously shaped like a funnel. At the opposite end of the fill tube 107, a fluid outlet 127 is located near the ribs 119 and above the passage 103. Resting above the ribs 119 is an optional pre-filter 109. The pre-filter 109 advantageously filters larger droplets of oil. The pre-filter occupies space between the housing 101 and a lower support member 111 for a main filter 113. The lower support member 111 is disposed in the housing radially between the pre-filter 109 and the oil fill tube 107. A main filter 113 is located above the pre-filter 109 and rests on the lower support member 111. The main filter 113 advantageously filters smaller droplets of oil.

Figure 2:
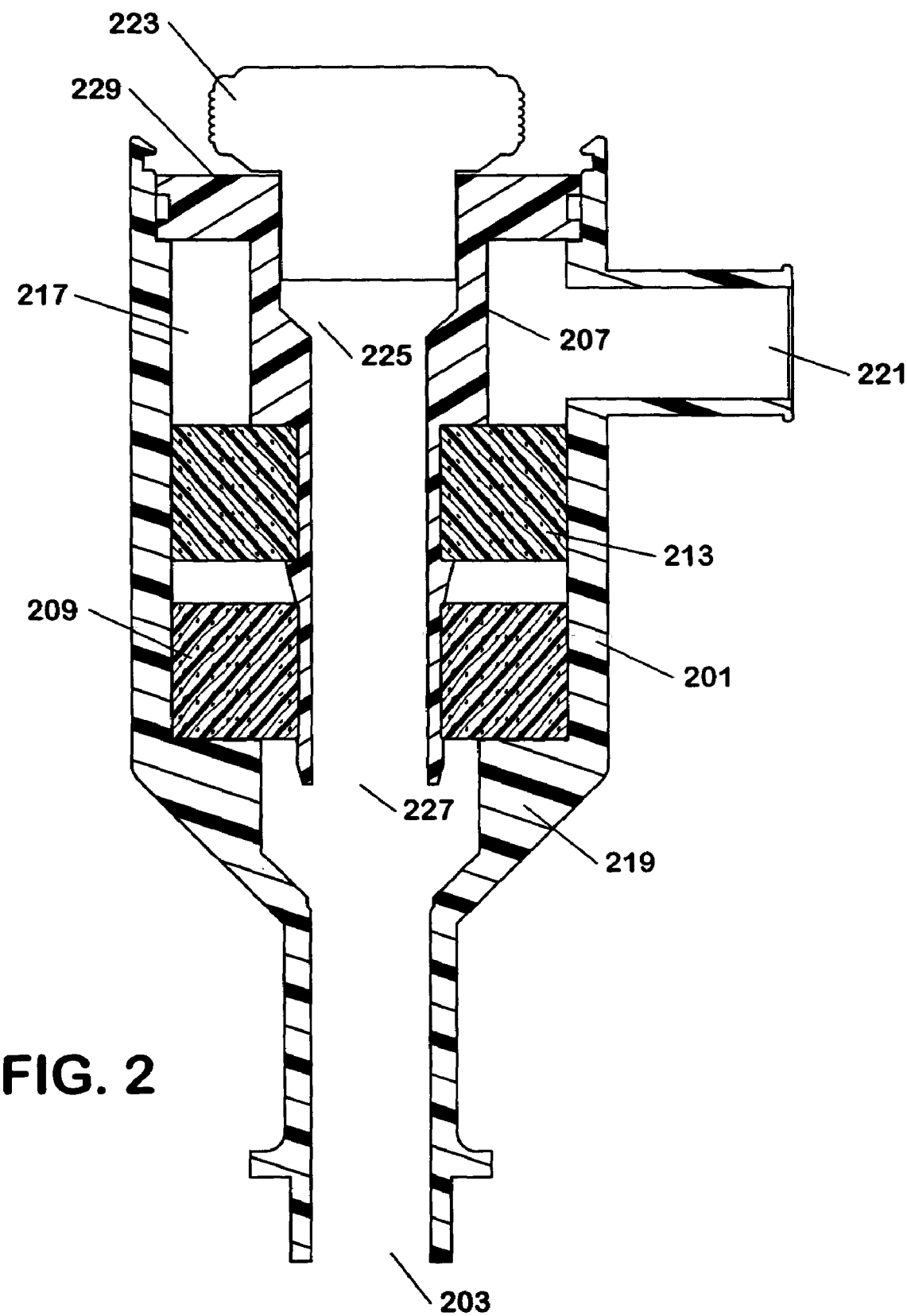
FIG. 2 is a cross-sectional view of an alternate embodiment of an integrated oil separator and oil fill tube in accordance with the invention.

The main filter 113 advantageously has a cylindrical shape and is located outside of the oil fill tube 107 and inside the housing 101. In the embodiment shown in FIG. 1, gas flows radially through the main filter 113, and space is provided on each side of the main filter 113. In the embodiment shown in FIG. 2, gas flows axially through a main filter 213, and space is provided above and below the main filter 213. The main filter 213 advantageously touches both a housing 201 and an oil fill tube 207.

An upper support member 115 is located above the main filter 113 and extends between the main filter 113 and the housing 101. Filtered gas exiting the main filter 113 enters a collection chamber 117 through an opening between the upper support member 115 and the oil fill tube 107. The collection chamber 117 is shown located above the upper support member 115 and bordered by the housing 101 on the outside, the oil fill tube 107 on the inside, and a cap 129 on the top. The cap 129 in the embodiment shown is integrated with the oil fill tube 107, and for example, the fill tube 107 extends toward the housing 101 to provide the cap 129. The cap 129 may also be a separate component between the housing 101 and the oil fill tube 107. The cap 129 may be fastened to the housing 101 by the use of clips, threads, rings, screws, and so forth.

A gas outlet 121 is located at or near the top of the housing 101. In the embodiment shown, the gas outlet 121 is integrated with the housing 101. The gas outlet 121 is in fluid communication with collection chamber 117.

A removable plug 123 is shown installed at one end of the oil fill tube 107. The plug 123 may be removable to service the engine, and may advantageously be threaded into the oil fill tube 107 and/or the cap 129. The plug 123 may advantageously be a unidirectional valve.

During engine operation, the apparatus serves as an oil separator for blow-by gases. The solid-lined arrows in FIG. 4 denote the flow of gas through the apparatus, while the dotted-lined arrows denote the flow of liquid oil. The passage 103 permits unfiltered gas from the engine to enter the housing 101 and liquid oil to exit the housing 101. Unfiltered gas passes upward through the passage 103 and continues between the ribs 119 into the optional pre-filter 109. The ribs 119 direct unfiltered gas into the pre-filter 109, while permitting liquid oil to drain back into the passage 103.

Figure 3:
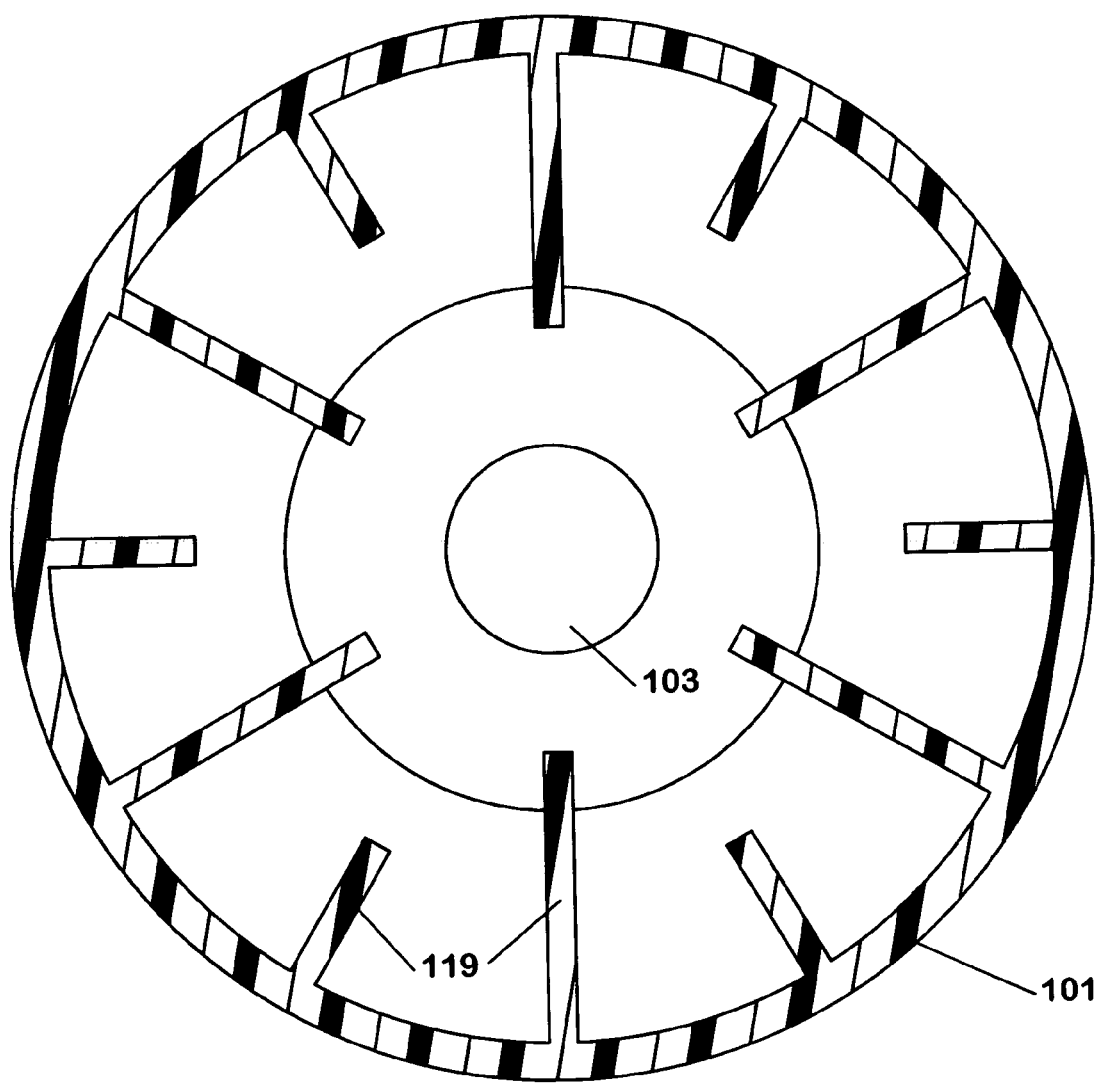
FIG. 3 is a cross-sectional view of an integrated oil separator and oil fill tube in accordance with the invention.

A sectional view 131 from FIG. 1 is shown in FIG. 3. The ribs 119 are arranged radially inwardly and substantially perpendicular to the inner surface of the housing 101. The liquid oil draining through the ribs 119 is oil that has been removed from the blow-by gas. The ribs 119 may be formed in any configuration that permits gas and oil to pass between them. The configuration and dimensions of the ribs may be optimized for flow area of gas and oil, and also for adequate support of the pre-filter 109.

After exiting the pre-filter 109, the gases flow through the opening between the lower support member 111 and the housing 101, and continue through the main filter 113. The main filter 113 is advantageously a high efficiency fibrous media filter that removes oil from the gas. The oil that is removed from the gas coagulates on the outer surface of the main filter 113 and flows downward, past the lower support member 111, through the pre-filter 109, between the ribs 119, and into the passage 103 by force of gravity.

Above the main filter 113, the filtered gas passes between the upper support member 115 and the oil fill tube 107, and enters the collection chamber 117. Filtered gas exits the housing 101 from the collection chamber 117 through the gas outlet 121.

When the engine is not operating, oil may be added to the engine through the apparatus. During oil fill, the plug 123 is removed. Oil enters the fluid inlet 125 of the fluid inlet tube 107, travels through the fluid inlet tube 107, and exits through the fluid outlet 127 into the passage 103 of the housing.

Figure 5:
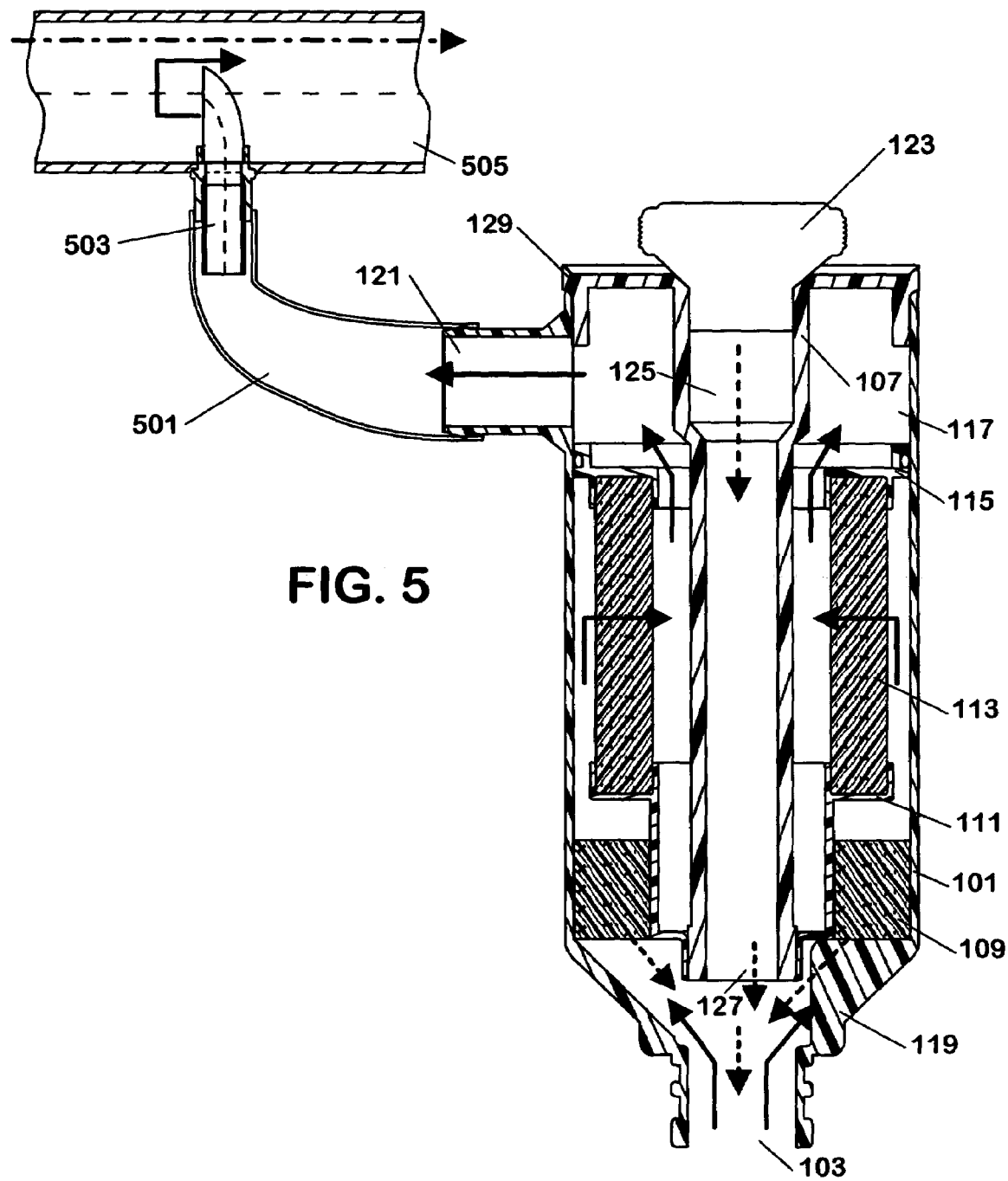
FIG. 5 is a cross-sectional view of an integrated oil separator and oil fill in association with an reverse pitot tube in accordance with the invention.
Figure 6:
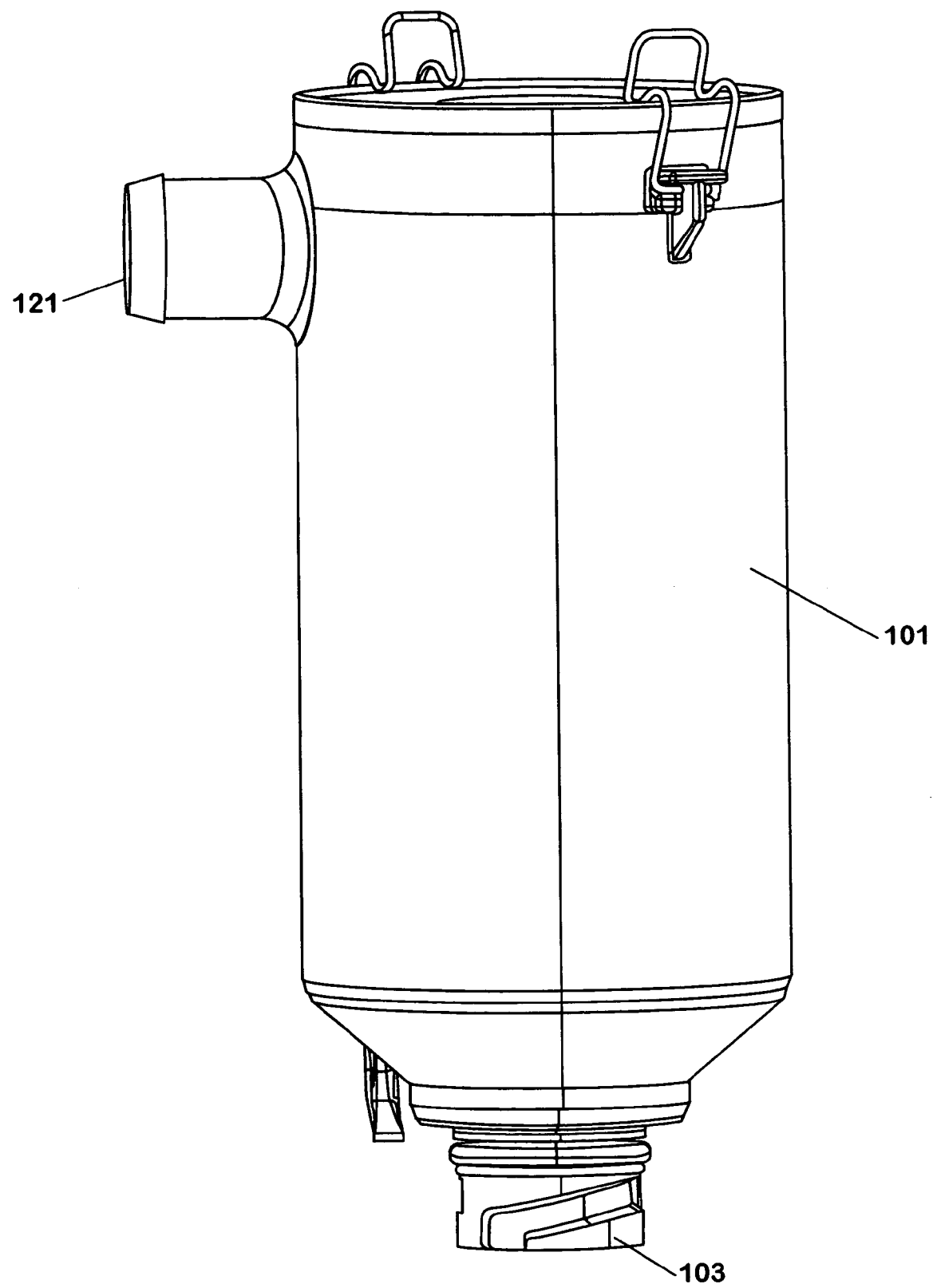
FIG. 6 is an isometric view of an integrated oil separator and oil fill tube in accordance with the invention.

A pressure control device may be provided downstream of the gas outlet 121 of the housing 101 to control the pressure and flow rate of the blow-by gas. The gas exiting the housing 101 enters a gas transfer tube 501, as shown in FIG. 5. The gas travels through the gas transfer tube 501 and into a reverse pitot tube 503. The reverse pitot tube 503 is disposed in an engine intake air passage 505, with the open end of the pitot tube 503 facing toward the incoming air flow. In FIG. 5, the double-dot-with-dash-lined arrow denotes the flow direction of the engine intake air. Air from the intake air passage 505 applies a positive pressure via the reverse pitot tube 503 to the gas exiting the housing 101 through the gas outlet 121 to control leakage of blow-by gases from the combustion cylinders.

Figure 4:
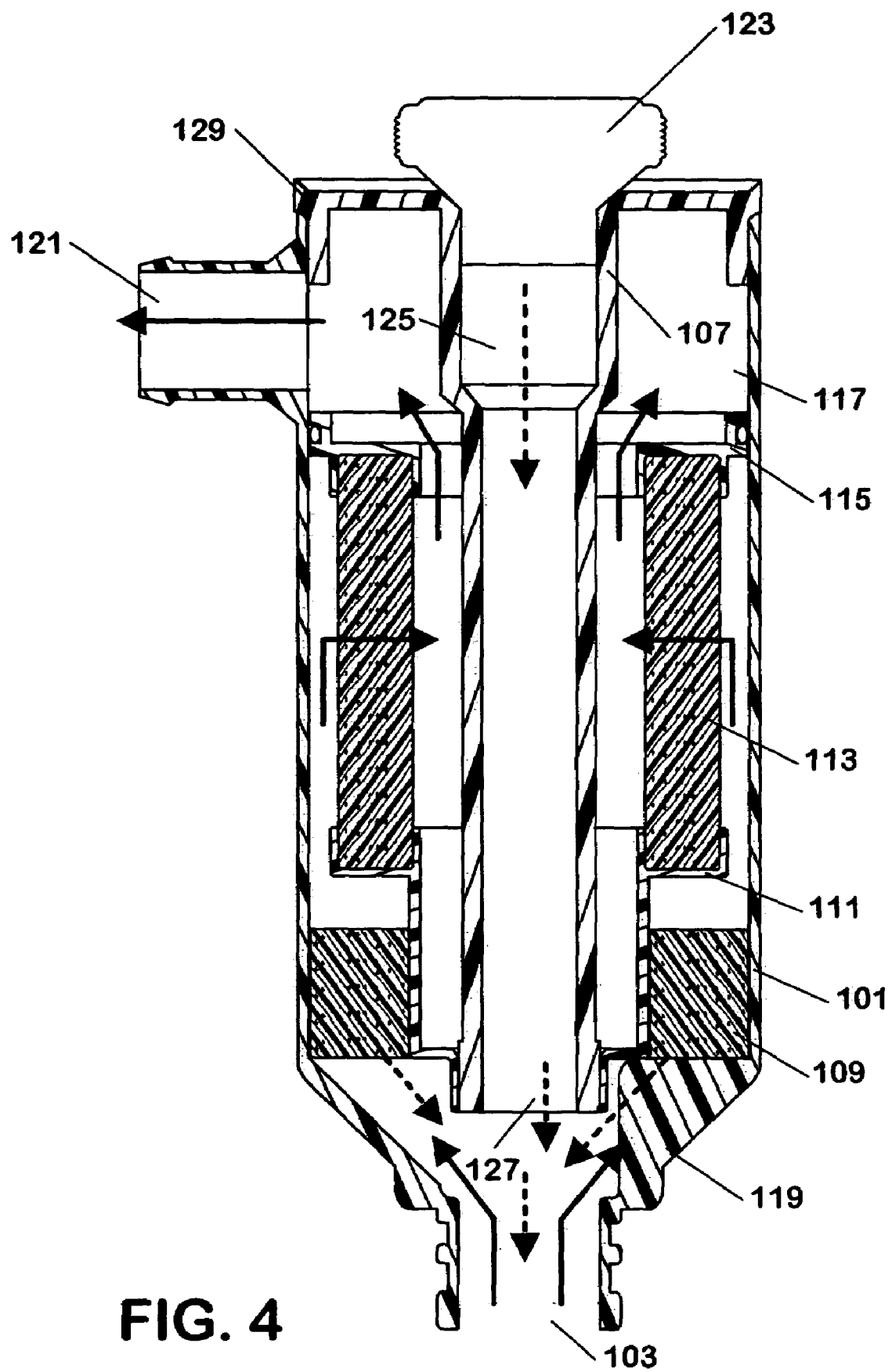
FIG. 4 is a cross-sectional view of an integrated oil separator and oil fill tube with functional fluid paths in accordance with the invention.

Depending to the configuration of the interfaces between the components in the apparatus, seals may optionally be added to advantageously reduce the leakage of gases other than through the gas outlet 121. For example, FIG. 4 shows an internal seal 401 that may be added to the interface between the upper support member 115 and the housing 101 to prevent leakage of gas around the main filter 113. An external seal 403 may advantageously be added in the interface between the cap 129 and the housing 101 to prevent leakage of gas outside the housing. The oil fill tube 107 and the housing 101 may be advantageously made from molded plastic. The components in the apparatus can also be formed in various shapes. The housing 101 and housing 201, the fill tube 107 and fill tube 207, the cap 129 and cap 229, and the plug 123 and plug 223 of the embodiments of FIG. 1 and FIG. 2 may be the same.

This invention is advantageous to the packaging of engines. The successful integration of two systems saves engine compartment space, and may be used for any engine configuration, for example, Vee configurations, inline configurations, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a housing;
   a fill tube disposed within the housing, wherein the fill tube has a fluid inlet at one end and a fluid outlet at another end, wherein the fluid outlet is disposed near a passage of the housing, and wherein a fluid from the fill tube is capable of draining into the passage;
   a cylindrical filter element having a permeable cylindrical surface disposed between the fill tube and the housing, such that unfiltered gases from the passage are capable of passing through the cylindrical surface;
   a plurality of ribs disposed between the passage and the cylindrical filter element, wherein the ribs are arranged to direct unfiltered gases from the passage into a space between the cylindrical filter element and at least one of the fill tube and the housing, wherein the ribs are arranged to permit a fluid from the removable filter element to drain into the passage;
   a support member disposed between the cylindrical filter element and the housing;
   a gas outlet integrated with the housing, the housing, fill tube, ribs, and filter element defining an exclusive flow path for gas extending from the passage, through the ribs, through the cylindrical filter element, and through a space between the cylindrical filter element and at least one of the fill tube and the housing, to the gas outlet.

2. The apparatus of claim 1, further comprising a cap located above the cylindrical filter element and disposed between the fill tube and the housing.

3. The apparatus of claim 1, further comprising a cap integrated with the housing.

4. The apparatus of claim 1, wherein the fill tube extends toward the housing to provide a cap.

5. The apparatus of claim 1, wherein a plug is disposed in one end of the fill tube.

6. The apparatus of claim 5, wherein the plug is a unidirectional valve.

7. The apparatus of claim 1, wherein the housing and the fill tube are molded plastic.

8. The apparatus of claim 1, further comprising at least one seal disposed within the housing and arranged and constructed to prevent gas from bypassing at feast one the cylindrical filter element and the gas outlet.

9. The apparatus of claim 1, wherein the cylindrical filter element is disposed radially outwardly of an outer surface of the fill tube and radially inwardly of an inner surface of the housing.

10. The apparatus of claim 1, further comprising a second filter disposed in the housing.

11. The apparatus of claim 1, further comprising a gas passage in fluid communication with the gas outlet of the housing and an engine air intake passage.

12. The apparatus of claim 11, further comprising reverse pitot tube disposed in the engine air intake system.

* * * * *